United States Patent Office 3,745,043
Patented July 10, 1973

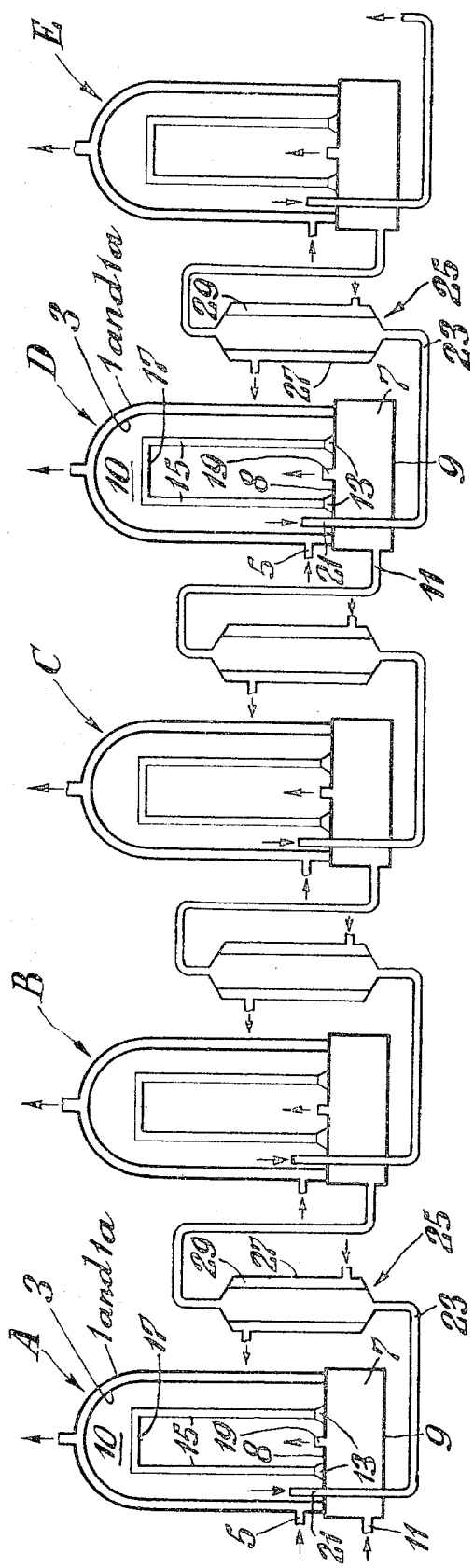

3,745,043
MANUFACTURE OF SILICON METAL FROM DICHLOROSILANE
Howard B. Bradley, St. Marys, W. Va., assignor to Union Carbide Corporation, New York, N.Y.
Filed May 13, 1971, Ser. No. 143,137
Int. Cl. C23c 11/00, 13/00
U.S. Cl. 117—201            8 Claims

ABSTRACT OF THE DISCLOSURE

A process for the manufacture of silicon metal by the decomposition of dichlorosilane in admixture with hydrogen in a reaction zone containing a decomposition surface wherein the residence time of the gases within the reaction zone is not greater than about 3/10 of a second. This process achieves minimum formation of by-production chlorosilanes.

---

This invention relates to a novel process for the manufacture of semiconductor silicon metal by the decomposition of dichlorosilane.

It is now known that dichlorosilane constitutes a superior source of silicon for the manufacture of polycrystalline silicon metal which is suitable for use in making semiconductor devices. When dichlorosilane is fed to a reactor possessing a heated rod therein at $H_2SiCl_2$ decomposition temperatures, it is possible to obtain at least 50 mole percent conversions to silicon metal, basis moles of Si fed to the reactor. As a result, there is less by-product $SiCl_4$ produced than is the case when $HSiCl_3$ is the feed material.

It is also known that dichlorosilane decomposes to silicon metal when in the presence of $H_2$ in accordance with the following equation:

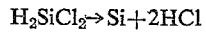

$$H_2SiCl_2 \rightarrow Si + 2HCl$$

and that the HCl produced reacts with deposited silicon metal to produce trichlorosilane in accordance with the following equation:

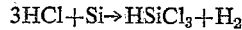

$$3HCl + Si \rightarrow HSiCl_3 + H_2$$

A recent discovery has shown that $HSiCl_3$ decomposes in the presence of $H_2$ to produce silicon metal according to the following equation:

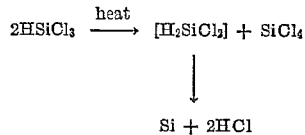

$$2HSiCl_3 \xrightarrow{heat} [H_2SiCl_2] + SiCl_4$$
$$\downarrow$$
$$Si + 2HCl$$

Thus the trichlorosilane produced by the reaction of HCl with Si metal constitutes a source of Si metal and unwanted $SiCl_4$.

Previous efforts have shown that the decomposition of $H_2SiCl_2$ yields by-product $HSiCl_3$ and $SiCl_4$, both of which it is believed, result from the reaction of HCl with Si metal.

There has now been found a method by which $H_2SiCl_2$ can be decomposed to Si metal and HCl without consequent reaction of HCl with deposited Si metal. This means that it is now possible for the first time to decompose a chlorosilane without the formation of by-product chlorosilanes.

The process of this invention involves the introduction of a mixture of $H_2SiCl_2$ and $H_2$ to a reactor containing a hot decomposition surface therein onto which silicon metal is deposited and maintaining the flow of gases in said reactor such that the residence time thereof is not greater than about three-tenths (3/10) of a second. In other words, the dichlorosilane-hydrogen gas mixture plus by-product HCl remain on the average in the reactor from the time of introduction to the time of removal for no longer than about 3/10 of a second.

It has been found, quite surprisingly, that the rate of the reaction of HCl, produced by the decomposition of $H_2SiCl_2$, with Si metal is slow enough and sufficiently less than the rate of said decomposition reaction, that HCl does not react with Si metal when the residence time of the gases in the reactor is less than about 3/10 of a second.

Such a low residence time means that substantially less than 50 mole percent of the $H_2SiCl_2$ introduced is decomposed to Si metal. Thus the off-gases from the reactor comprise unreacted $H_2SiCl_2$, HCl and $H_2$. However, this invention includes the presence in the off-gases of small quantities of $HSiCl_3$ and $SiCl_4$, the total of which is not greater than a conversion of 5 mole percent of the $H_2SiCl_2$ to $HSiCl_3$ and $SiCl_4$ in the reactor.

This unreacted gas mixture can be recycled to the reactor to increase the Si yield therein or can be fed to another reactor or can be treated to remove HCl and the remaining $H_2SiCl_2$ and $H_2$ is recycled or fed to another reactor.

In another embodiment of this invention, there is described herein a multi-reactor system wherein a plurality of reactors are openly interconnected in series, each reactor to an adjacent reactor in the series, by lower temperature non-reacting zones in which the effluent gases from the preceding reactor are cooled such that when the gases are fed to the next reactor for further decomposition of $H_2SiCl_2$, the HCl in said gas stream is unable to react with Si metal already deposited on the decomposition surface in said next reactor. In this manner, it is possible to partially react a $H_2SiCl_2$—$H_2$ gas mixture in the first reactor within the 3/10 of a second residence time, remove the effluent gas mixture of $H_2SiCl_2$, HCl and $H_2$, cool it, and then feed it to another reactor under the same residence time requirements without allowing reaction of the HCl in the feed with the deposited Si metal.

With respect to the preceding embodiment, it has been found that when the hot effluent gases from a first reactor are cooled below, e.g., about 800° C., the HCl therein loses enough sensible heat such that when the gases are fed to a second reactor, the heat loss is not made up when the residence time therein is low such that even with the increased concentration of HCl (that present in the effluent gas feed and that produced in the second reactor), no reaction of HCl occurs with the deposited metal in the second metal reactor. This procedure can be repeated for a number of reactors in series, preferably not more than about 6 reactors in series.

In order to have a better understanding of this invention and the processes described herein, reference is made to the drawing which schematically depicts in cross-section a multiple reactor system in which at least two reactors are linked in series for the production of silicon metal. It should be understood that the process herein described is applicable to the production of polycrystalline silicon metal and epitaxial silicon metal layers. The principal factor which distinguishes the two types of silicon metal deposits is the concentration of dichlorosilane in the feed to the reactors.

With respect to the drawing there is described five reactors in series, designated as A, B, C, D, and E. They are indistinguishable in structure and therefore reference to the construction of one speaks for the construction of the others. With respect to reactor A, it is provided with a cylindrical bell jar cover 1 which possesses a hollow interior therein between walls 1a and 3 which are sealed together at the bottom open end of cover 1. At the bottom portion, close to the open end of cover 1, is inlet 5 extending through outer wall 1a of cover 1. When fluid is introduced under pressure into inlet 5 the fluid rises in the interior hollow formed between walls 1a and 3 to be removed from exit opening 6 at the round closed top of cover 1. In this manner, one may circulate completely around cover 1 a fluid which can serve the purpose of either adding or withdrawing heat from the interior surface of wall 3 of the cover 1. The bell jar cover 1 is made of quartz, the weight of the cover 1 is sufficient to hold it in position on top of plate 8. Below plate 8 is a manifold chamber 7 circumscribed by metal walls 9 and possessing inlet 11 for the introduction of the reaction gases to the reaction space 10 within cover 1. Extending through base plate 8 is feed inlet 19 which openly connects chamber 7 and the reaction space 10.

Extending through base plate 8 is an exit tube 21. Tube 21 serves the purpose of withdrawing the reaction effluents from reaction space 10. Located in reaction space 10 are carbon rod or wire holders 13 into which are affixed deposition rods or wires 15 held together by either a wire or rod 17. It is to be understood that in the practice of this invention, the selection of the deposition surface can be varied greatly. For example, the deposition surface may be a wire rather than a rod or a bar rather than a wire or rod. The connecting wire or rod 17 may be similar or dissimilar to the deposition surfaces 15 or wire or rod 17 can be an integral part of rods or wires 15. Various embodiments are practiced in the art; and with respect to the nature of the deposition surface in particular, such embodiments do not affect the practice of this invention and the benefits thereof. The rods may be made of silicon, tantalum or tungsten.

The mixture of the feed gases are introduced through inlet 11 and thence through feed inlet 19 at a sufficient rate such that the average residence time of the gases in the reaction space 10 is no more than about $3/10$ of a second. This may be controled by appropriate sizing of the feed inlets as well as exit tubes and openings to remove the effluents. It also is dependent upon the rtae of withdrawal of gases in space 10 such that only for a small amount of time are the feed products and by-products of the reaction present therein.

The reaction effluent withdrawn from tube 21 is passed through the connecting tube 23 into a temperature reducer 25. Temperature reducer 25 in essence is a condenser which serves the function of lowering the temperature of the effluent to a sufficient degree to preclude subsequent reaction of HCl when it is introduced into a reaction zone where silicon metal deposition is being effected.

Temperature reducer 25 has about it a cooling jacket 27 which possesses a fluid space 29 which is fed through port 31 and fluid is withdrawn through port 33. The cooler gases from temperature reducer 25 are withdrawn through tube 35 and fed into the second reactor. It is fed to reactor B in the same manner as reaction gas is fed to reactor A. The whole procedure is repeated through each of the reactors in series until the desired results in terms of metal deposition and yields are achieved.

It should be understood that the design of the reactor system is not critical to the practice of this invention. It is not necessary to carry out the process of this invention in bell jar type reactors. The process of this invention may be carried out in cylindrical (horizontal or vertical reactors where the entry and exit passages are aligned along a single axis. Any other reactor design heretofore used can be employed in the process of this invention.

Polycrystal growth is achieved by the gross deposition of silicon metal. The rate of deposition and to some extent the nature of the substrate determines whether the growth is polycrystal or single crystal. When the deposition is slow, single crystal growth is favored. Since the temperature of deposition is fixed within a range, deposition is controlled by the concentration of dichlorosilane at the deposition surface or the presence of deposition depressants such as HCl. The concentration of dichlorosilane fed to the deposition surface may be about 3 to 30 mole percent of the gases in the reactor when producing polycrystalline metal and below that when producing single crystals or epitaxial layers.

The gases provided in the reactor may be inert gases such as nitrogen, argon, neon and the like, and hydrogen. Hydrogen gas in a concentration of at least 30 mol percent is desirably provided in the reactor. Usually, not more than about 30 mol percent of the gases are inert gases. The remainder of the gas composition is dichlorosilane. Preferably, the gas composition fed to the reactor is 0.01 to 30 mole percent dichlorosilane, 0 to 30 mole percent inert gas and the remainder is hydrogen. Dichlorosilane is desirably employed in amounts of more than 5 mole percent up to 30 mole percent of the gases fed to the reactor Typically, one may employ, in the most favorable practice, from 6 to 25 mole percent of dichlorosilane when making polycrystalline metal and lesser amounts when making single crystal layers. In the most favorable embodiment of this invention, the only gases fed to the first reactor are dichlorosilane and hydrogen.

The temperature of the deposition surface for the manufacture of good quality silicon metal is at least 800° C. and not greater than the melting temperature of silicon metal. In the preferred practice of the process, the temperature at the deposition surface is at least about 900° C. and typically not greater than 1300° C. Usually, it is found most convenient to operate the reaction at between about 950° C. and 1250° C., and 1050° C. to 1150° C. has been found to be an effective range.

The reactor walls are kept sufficiently cool such that the interior surface thereof facing the interior of the reactor is not greater than about 300° C. to about 350° C. This prevents the formation of amorphous silicon containing deposits on the wall. The wall temperature of the reactor can be as low as the boiling point of dichlorosilane. If the reaction is carried out in such a manner as to produce some by-product trichlorosilane and/or silicon tetrachloride, then it is desirable to maintain the wall temperature at least as high as the boiling point of the higher boiling chlorosilane by-product present. For example, if only trichlorosilane is produced as a by-product, then the wall temperature should be at least as high as the boiling point of trichlorosilane. However, if silicon tetrachloride is formed as well, then the wall temperature should be as high as the boiling point of silicon tetrachloride. The reason for doing this is to preclude the possibility of condensation of these by-products on the wall and insure their removal from the reactor. Even should these materials condense on the interior walls of the reactor, they would not adversely effect the reaction except to the extent that one must be careful when opening the reactor to remove the deposition surface to avoid vaporizing these silanes in air and prevent their inhalation and contacting either the skin or eyes of the operator. The preferred practice, of course, is to maintain the wall temperature sufficiently warm enough to insure the steady removal of these by-products from the reactor during the deposition of Si metal. Theoretically speaking, the wall temperature of the reactor could be down to the freezing temperature of $H_2SiCl_2$ if it were possible to sufficiently heat the deposition surface to the desired deposition temperature. However, from a practical standpoint, the wall temperature should not be below the boiling point of dichlorosilane.

The purpose of specifying a maximum wall temperature of 300° C. to 350° C. is based upon experiences in attempting to accurately determine the internal wall temperature of the reactor. In order to provide such a low wall temperature in a reactor employing a rod at a temperature of at least about 800° C., it is usually necessary to employ a jacketed reactor where a cooling fluid is circulated to withdraw heat radiated to the walls. Temperature measuring probes, such as thermocouples, at the interior walls are insufficient since their measurement of radiant heat is dependent upon their compositional structure which differs from that of the walls. Measuring the exit temperature of the cooling fluid from the cooling jacket fails to provide a most accurate and specific indication of the temperature of the wall internal of the reactor. Thus it is necessary to be somewhat indefinite about the internal wall temperature at which deposition of amorphous product at the internal wall is prevented. However, it has been noted that when the coolant exit temperature from the jacket is about 300° C. or below, or the exterior wall temperature is about 300° C. or below (as indicated by temperature measuring probes) essentially all formation of amorphous product at the internal wall is prevented. Hence, the maximum wall temperature of 300° C. to 350° C. probably means, in most cases, a temperature of about 300° C. rather than about 350° C. This means that the wall temperature at which wall deposition of amorphous product generally occurs is closer to about 350° C. than to 400° C.

The employment of a reactor having a wall temperature below about 300° C. to 350° C. provides other significant advantages. It precludes reaction at the wall which could introduce impurities into the deposited silicon metal, such as phosphorus and boron impurities, whose presence in fractional parts per billion, based on the weight of the metal, could render the metal unsuitable for semiconductor usage. It allows the operator to work closer to the reactor and minimizes the potential of damage to the reactor.

reaction zone is less than about 3/10 of a second. In the following experiment, the reaction temperature, that is the rod temperature (in this case a graphite rod) is 1100° C. and the residence time is 2/10 of a second for the gases within the reactor.

| | |
|---|---|
| First reactor feed | 100 moles of dichlorosilane and 1000 moles of hydrogen. |
| Effluent gases from first reactor. | 77 moles of dichlorosilane, 46 moles of HCl and 1,000 moles of hydrogen; 23 moles of silicon deposited on the graphite rod. |
| Second reactor feed | Effluent from first reactor cooled to 300° C. |
| Effluent from second reactor. | 59.3 moles of dichlorosilane, 81.4 moles of HCl and 1,000 moles of hydrogen; 17.7 moles of silicon deposited on rod. Effluent cooled at 300° C. |
| Feed to third reactor | Effluent from second reactor. |
| Effluent from third reactor. | 43.4 moles of dichlorosilane, 113 moles of hydrogen chloride, 1,000 moles of hydrogen; 15.9 moles of silicon metal deposited on rod. Effluent cooled to 300° C. |
| Feed to fourth reactor | Effluent from third reactor. |
| Effluent from fourth reactor. | 33.4 moles of dichlorosilane, 133 moles of HCl and 1,000 moles of hydrogen; 10 moles of silicon deposited on rod. Effluent cooled to 300° C. |
| Feed to reactor five | Effluent from fourth reactor. |
| Effluent from reactor five. | Shows that overall, 74.3 moles of dichlorosilane in the feed to the five reactors is converted to silicon metal. No by-product trichlorosilane and silicon tetrachloride formed. |

In the following table is a single pass experiment in the reactor described in copending U.S. application, Ser. No. 082,776, filed Oct. 21, 1970 now abandoned, wherein the feed is a mixture of dichlorosilane and hydrogen gas in the proportions indicated in the table. It shows that by controlling the residence time at 2/10 of a second to about 3/10 of a second, one can essentially preclude the formation of trichlorosilane and silicon tetrachloride.

TABLE 1

| Residence time, seconds | Graphite rod temperature °C. | Mole percent $H_2SiCl_2$ in $H_2$ feed | Percent of $H_2SiCl_2$ molecules decomposed | Percent of $H_2SiCl_2$ feed issuing as $H_2SiCl_2$ | Percent of $H_2SiCl_2$ feed issuing as $HSiCl_3$ | Percent of $H_2SiCl_2$ feed issuing as $SiCl_4$ | Percent of $H_2SiCl_2$ feed deposited as Si | Reactor wall temperature °C. |
|---|---|---|---|---|---|---|---|---|
| 10 | 1,080 | 7.0 | 97.6 | 2.4 | 23.8 | 14.4 | 59.4 | 60 |
| 3 | 1,100 | 6.2 | 86.8 | 13.2 | 29.7 | 4.3 | 52.8 | 60 |
| 1 | 1,010 | 6.5 | 61.3 | 38.7 | 9.4 | 0.4 | 51.5 | 60 |
| 0.7 | 1,250 | 5.4 | 36.0 | 64.0 | 8.2 | 0.3 | 27.5 | 60 |
| 0.5 | 1,040 | 8.4 | 27.0 | 73.0 | 7.8 | 0.5 | 18.7 | 60 |
| 0.3 | 1,020 | 7.1 | 14.0 | 86.0 | 3.3 | 0.1 | 10.6 | 60 |
| 0.28 | 1,050 | 7.0 | 17.5 | 82.5 | 0.8 | 0.0 | 16.7 | 60 |
| 0.2 | 1,050 | 7.0 | 23.0 | 77.0 | 0.0 | 0.0 | 23.0 | 60 |

A wide variety of fluid coolants can be employed to maintain the wall temperature below about 300° C. to 350° C. Illustrative coolants include any gaseous material which does not react with the wall at the desired wall temperature, such as air, nitrogen, argon, neon, methane, ethane, carbon dioxide, carbon monoxide, dichloroethane, methylene chloride, methyl chloride, and the like; and any liquid material which does not react with the wall at the desired wall temperature, such as water, silicone fluids and oils, petroleum oils, eutectic mixture of diphenyl and diphenyloxide, orthodichlorobenzene, other liquid halohydrocarbons, and the like. Any of the commercial and/or conventional fluid heat transfer media may be so employed.

One of the characteristics of this invention is the fact that the yields of silicon metal obtained and the rate of deposition appear to be independent of the type of reactor employed and the size thereof, in terms of internal volume thereof. Thus, regardless of the reactor employed, a given reaction feed gas mixture will perform in essentially the same manner regardless of whether the reactor is a bell jar reactor or a cylindrical reactor, and the like, in terms of yields of silicon metal obtained, percent of dichlorosilane reacted, composition of effluent gases from each reactor, and the like, provided that the reactors are operated at the same reaction temperature in terms of the temperature of the decomposition surface and the reactor walls, and the average residence time of the gases in the reaction zone Though this invention has been described with respect to a plurality of details thereof, it is not intended that this invention should be limited thereby except to the extent that such are provided in the claims.

What is claimed is:

1. A process for the manufacture of silicon metal by the decomposition of dichlorosilane in admixture with hydrogen in a reactor having a wall temperature below about 300° C. to 350° C. and containing a decomposition surface at at least 800° C. wherein the residence time of the gases within the reactor is not greater than about 3/10 of a second.

2. The process of claim 1 wherein an amount of silicon equivalent to less than 5 mole percent of dichlorosilane fed to the reactor is converted to one or more of trichlorosilane and silicon tetrachloride.

3. The process of claim 1 wherein the effluent gases from the reactor are cooled outside of the reaction zone and thereafter fed again to a reactor wherein such decomposition is again effected.

4. The process of claim 3 wherein said process is repeated a plurality of times in series.

5. The process of claim 1 wherein the mixture of dichlorosilane and hydrogen contain also an inert gas therein.

6. The process of claim 5 wherein not more than 30 mole percent of the total moles of said mixture is an inert gas.

7. The process of claim 1 wherein the gas mixture comprises about 0.01 to about 30 mole percent dichlorosilane and the remainder is hydrogen.

8. The process of claim 1 in which a mixture containing dichlorosilane, hydrogen, HCl and up to small quantities of trichlorosilane and silicon tetrachloride is present in the reactor.

References Cited

UNITED STATES PATENTS

| | | | |
|---|---|---|---|
| 3,012,861 | 12/1961 | Ling | 117—106 A |
| 3,021,198 | 2/1962 | Rummel | 117—106 A |
| 3,091,517 | 5/1963 | Short | 23—223.5 |
| 3,200,001 | 8/1965 | Merkel | 117—106 A |
| 3,232,792 | 2/1966 | Rummel | 117—106 A |

FOREIGN PATENTS

| | | | |
|---|---|---|---|
| 671,446 | 10/1963 | Canada | 117—106 A |

ALFRED L. LEAVITT, Primary Examiner

M. F. ESPOSITO, Assistant Examiner

U.S. Cl. X.R.

117—106 A; 23—223.5